US007565305B2

(12) United States Patent
Shipley et al.

(10) Patent No.: US 7,565,305 B2
(45) Date of Patent: Jul. 21, 2009

(54) APPARATUS AND METHOD TO ESTIMATE THE VALUE OF A WORK PROCESS AND DETERMINE GAPS IN CURRENT AND DESIRED STATES

(75) Inventors: David N. Shipley, Vallejo, CA (US); Paul S. Lundy, Katy, TX (US); David W. Tuk, Fairfield, CA (US); Charles F. Guthrie, Richmond, CA (US); Rick A. Dotterer, Pleasant Hill, CA (US); Michael Carney, Houston, TX (US)

(73) Assignee: Schlumberger Technology Corp., Houston, TX (US)

( * ) Notice: Subject to any disclaimer, the term of this patent is extended or adjusted under 35 U.S.C. 154(b) by 0 days.

(21) Appl. No.: 11/527,761

(22) Filed: Sep. 25, 2006

(65) Prior Publication Data
US 2007/0078703 A1  Apr. 5, 2007

Related U.S. Application Data

(60) Provisional application No. 60/720,953, filed on Sep. 26, 2005.

(51) Int. Cl.
*G06F 17/60* (2006.01)
(52) U.S. Cl. .................................. 705/7; 705/1; 705/10
(58) Field of Classification Search ................ 705/7
See application file for complete search history.

(56) References Cited

U.S. PATENT DOCUMENTS

| 6,161,101 | A | * | 12/2000 | Guinta et al. | 706/45 |
| 6,411,936 | B1 | * | 6/2002 | Sanders | 705/10 |
| 7,136,792 | B2 | * | 11/2006 | Balz et al. | 703/6 |
| 2002/0010563 | A1 | * | 1/2002 | Ratteree et al. | 703/2 |
| 2003/0004778 | A1 | * | 1/2003 | Gareau et al. | 705/10 |

(Continued)

OTHER PUBLICATIONS

Martin and Cheung, Change Management at Mobile Oil Australia, Proceedings of the 34th Hawaii International Conference on System Sciences—2001, p. 1-10.*

(Continued)

*Primary Examiner*—Andre Boyce
*Assistant Examiner*—Justin M Pats
(74) *Attorney, Agent, or Firm*—Robert P. Lord; Bryan P. Galloway

(57) ABSTRACT

A method involves identifying work elements of a work process which may be enhanced to provide a biggest impact on enhancing an overall value of the work process. The method involves identifying a plurality of work elements comprising a work process, interviewing one or more knowledgeable interviewees and determining existing states and enhanced proposed states of the plurality of work elements, visually displaying the existing and enhanced proposed states of the work elements, and estimating and visually displaying a change in value of the work process due to an enhancement of the work elements from the existing states to the enhanced proposed states.

14 Claims, 9 Drawing Sheets

U.S. PATENT DOCUMENTS

| | | | |
|---|---|---|---|
| 2003/0065543 A1* | 4/2003 | Anderson | 705/7 |
| 2003/0110067 A1* | 6/2003 | Miller et al. | 705/8 |
| 2003/0225644 A1* | 12/2003 | Casati et al. | 705/35 |
| 2004/0030563 A1* | 2/2004 | Porcari et al. | 705/1 |
| 2004/0034543 A1* | 2/2004 | Bartsch | 705/1 |
| 2004/0117234 A1* | 6/2004 | Lindsay-Scott et al. | 705/9 |
| 2005/0137950 A1* | 6/2005 | Palozzi et al. | 705/35 |
| 2006/0080326 A1* | 4/2006 | Akbay et al. | 707/100 |
| 2006/0162962 A1* | 7/2006 | Koederitz et al. | 175/27 |
| 2007/0078693 A1* | 4/2007 | Kaelin | 705/7 |

OTHER PUBLICATIONS

Wood, Excerpts from The HELIX Methodology: A comprehensive and proven Process Improvement Method, 2001, p. 1-31.*

Savarimuthu et al., Monitoring and controlling of a multi-agent based workflow system, Proceedings of second workshop on Australasian information security, Data Mining and Web Intelligence, and Software Internationalisation, 2004.*

Tamaki, Business Systems Review: A methodology for the management of change, The Bottom Line, vol. 8, No. 3, 1995, p. 14-19.*

Watson, Putting Value Back into Engineering, ASQ World Conference on Quality and Improvement Proceedings, Seattle, WA, vol. 59, May 2005, p. 163-174.*

Patel et al., Optimizing Cyclic Steam Oil Production with Genetic Algorithms, Society of Petroleum Engineers, 2005 SPE Western Regional Meeting, Irvine, CA, Mar. 30-Apr. 1, 2005, p. 1-8.*

* cited by examiner

APPARATUS AND METHOD TO ESTIMATE THE VALUE OF A WORK PROCESS AND DETERMINE GAPS IN CURRENT AND DESIRED STATES

CROSS REFERENCE TO RELATED APPLICATIONS

This application claims benefit of U.S. Provisional Application Ser. No. 60/720,953 filed on Sep. 26, 2005, entitled "Apparatus And Method To Estimate The Value Of A Work Process And Determine Gaps In Current And Desired States."

TECHNICAL FIELD

The present invention relates generally to methods and tools for estimating the value of a work process, and more particularly, to methods and tools employed to optimize the production of hydrocarbons.

BACKGROUND OF THE INVENTION

The Value of Information (VOI) in a decision making process or work flow is sometimes difficult to calculate. Classical VOI techniques are generally restricted to analysis of a single element or decision and also to a one-time acquisition of information. However, a work process (workflow) combines many elements and may use more than one piece of information. Additionally, the work process may acquire and use information continuously or repeatedly.

A work element is any distinct part of a workflow or work process that may be estimated for purposes of determining the extent that the element contributes value to either the present workflow or to a change in value to a proposed workflow (i.e., a workflow in which one or more work elements have been modified). A distinct part may be one or more devices or steps, or a combination of one or more devices and/or steps. Improvements may be made to one or more elements to improve a work process. These improvements may be the result of applying new technologies, such as new sensors or analytical tools. However, they may also be the result of improving the way existing data is collected and displayed. This may involve no change at all to the existing sensors as installed. The improvements may also be due to changing a process or behavior.

Access to relevant expert personnel is often restricted when evaluating a work process (or a workflow) due to competition for the time of the expert personnel. Therefore, a methodology or evaluation tool is desirable which elicits required information (i.e., what is the qualitative value improvement of changing the workflow procedure?) subject to the following preferred constraints. First, the tool should be logical and intuitive. Second, the tool should be easy to use and understand. Third, the results using the tool should be easy to view and analyze. Finally, the time to elicit the information necessary to evaluate a work process should be limited. Unfortunately, many work process evaluation tools and methods are complex, time consuming and produce results which are difficult to clearly comprehend.

Insight into the work processes (or a workflows) involving information flow is described by David B. Lawrence in his book entitled "The Economic Value of Information", Springer Company, 1999. This book describes how information may be split into two levels: System Data Processing and User Information Processing. This bifurcation simply separates the collection, storage, and provision of data by some method (for example, computer database) and the delivery of the data to a person, who must collect, understand and act upon the data. The result of this act is seen as increasing the value of this work process (or a workflow). However, this process has the shortcomings of not readily identifying those work elements of a work flow that can best be enhanced to provide maximum enhancement of the overall value of a workflow.

Therefore, there is a need for a tool and process methodology which estimates the qualitative improvement a workflow will experience if changes are made to the various elements of the workflow while avoiding the aforementioned shortcomings and complexities of previous work process evaluation methods and tools. For example, obtaining a perceived value of a change to an element of a workflow may establish the relative merits to implementing the change as opposed to a another change. The present invention addresses this need.

SUMMARY OF THE INVENTION

A method for identifying the work elements of a work process which may be enhanced to provide a biggest impact on enhancing the overall value of the work process is provided. The method includes identifying a plurality of work elements comprising the work process. One or more knowledgeable interviewees are interviewed and existing and enhanced proposed states of the plurality of work elements are determined. The existing and enhanced proposed states of the work elements are visually displayed. Also the change in value of the work process due to the enhancement of the work elements from the current existing states to the desired or enhanced proposed states is also displayed.

Optionally, one or more work elements which would have the biggest impact on enhancing the overall value of the work process are identified. The work process may then be enhanced by enhancing the one or more work elements selected as having the biggest impact on enhancing the value of the work process. The invention also includes an apparatus or computer tool which utilizes the aforementioned method. Also, the invention includes computer readable media which includes instructions for carrying out the above-identified method.

In general, in one aspect, the invention relates to a system for enhancing a work process comprising a data storage for storing a template; a data input device for receiving a knowledgeable interviewee rated element of an enhanced proposed state based on the template; and a processor for combining at least one knowledgeable interviewee input, the processor operatively coupled to the data input device, whereby a work element having a biggest impact on enhancing an overall value of the work process is displayed.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, aspects of the invention relate to a method and apparatus for identifying work elements in a work process which may be modified to enhance the overall workflow in accordance with one embodiment of the invention. More specifically, embodiments of the invention identify various work elements in the workflow, evaluate the current and proposed states of each of the work elements, and estimate a change in value of the workflow in view of the proposed states of each of the work elements.

Figure 1:
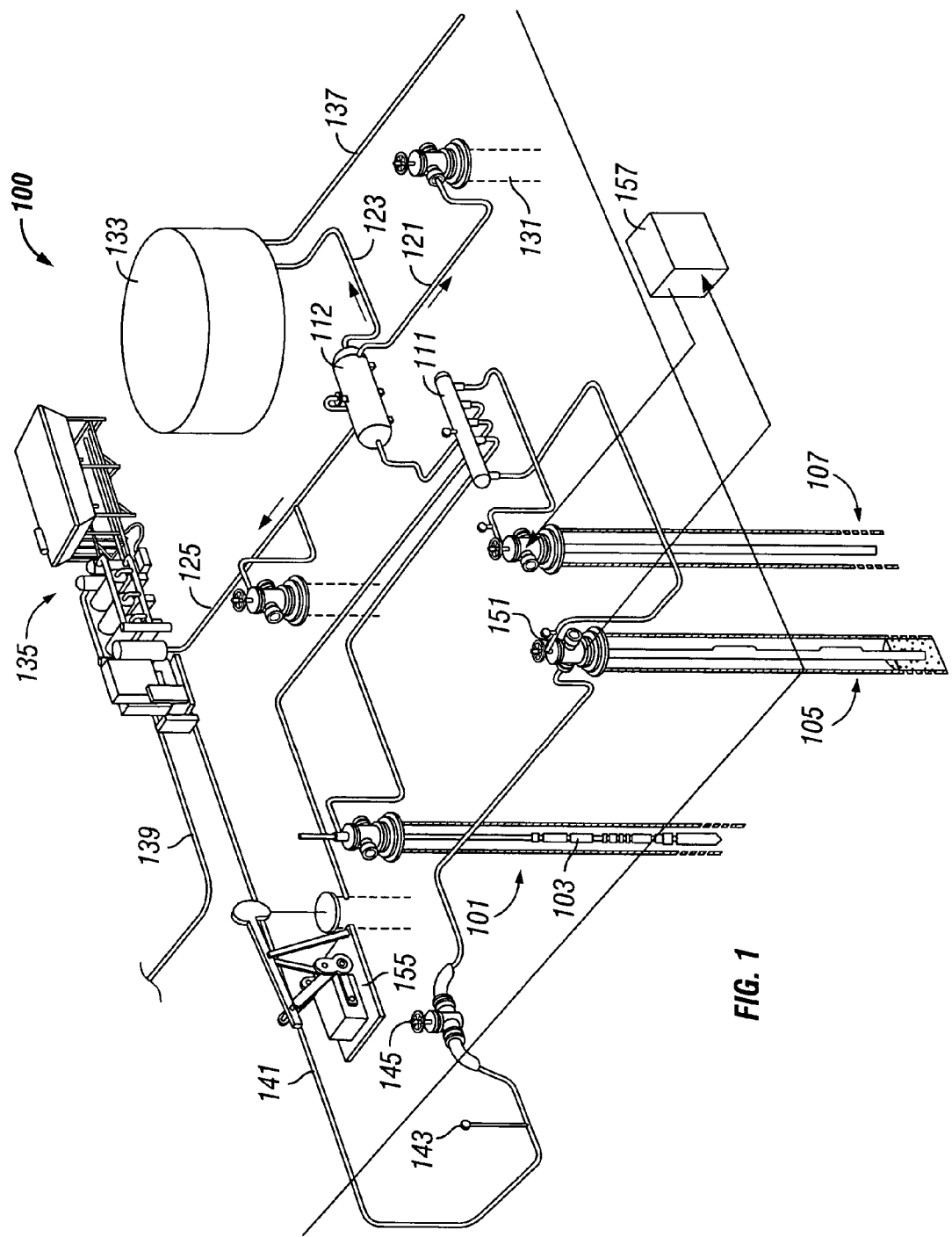
FIG. 1 shows an exemplary oilfield operation having a plurality of wellbores linked to an operations control center in accordance with an exemplary embodiment of the invention.
Figure 2:
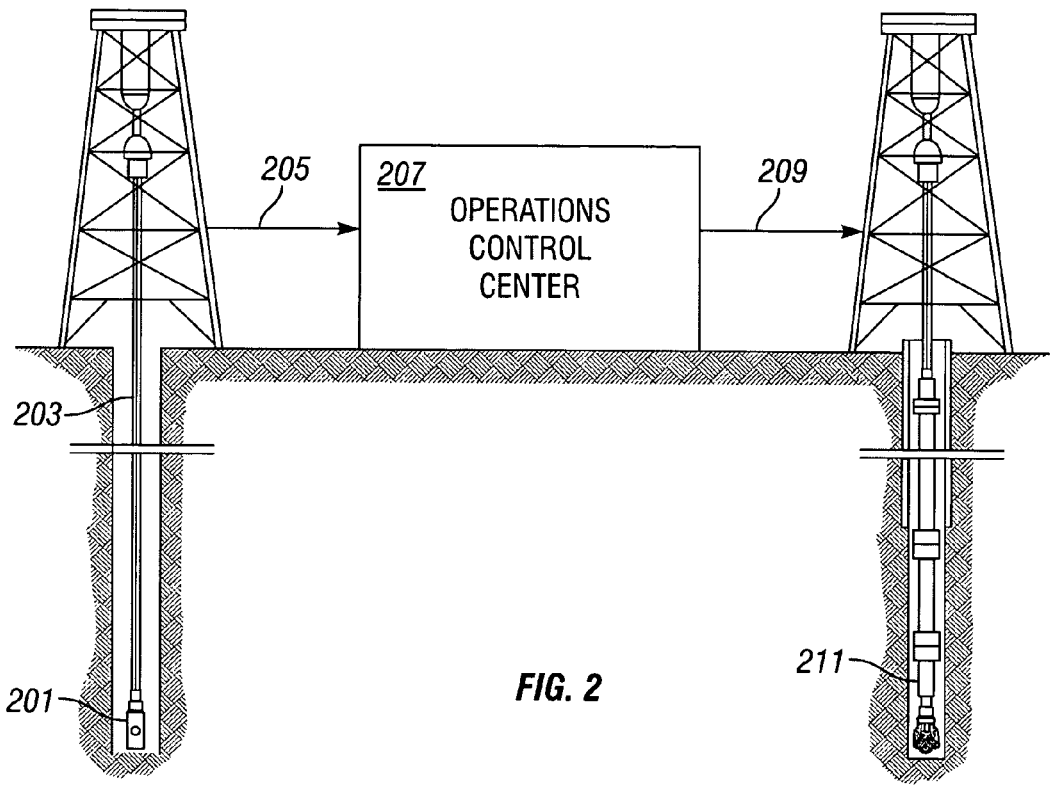
FIG. 2 shows two wellbores in communication with the operations control center of FIG. 1.
Figure 3:
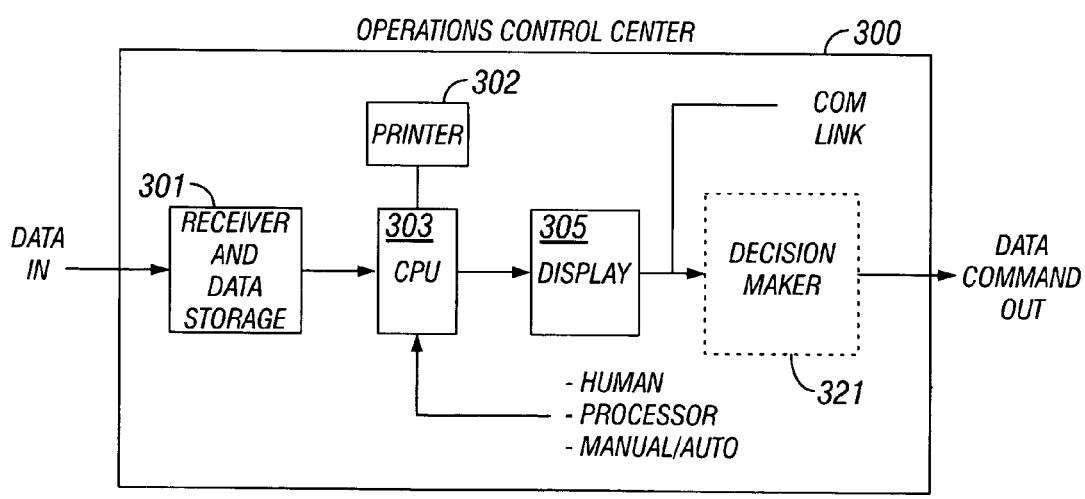
FIG. 3 shows a detailed view of the operations control center of FIG. 2.

Further aspects may be used to analyze workflows in any number of industries. One such industry is the oil and gas industry. FIGS. 1-3 depict an overview of an example containing various aspects of the oil and gas industry. Briefly, an oilfield operation may take many forms including operations performed before any drilling occurs, such as, for example, exploration, analysis, etc. In addition, an oilfield operation may include operations occurring after drilling, for example, well workover and intervention, as well as storage, transport and refining of hydrocarbons. Furthermore, an oilfield operation may also include operations performed during drilling.

Turning to FIG. 1, an oilfield operation 100 is depicted including machinery used to extract hydrocarbons, such as oil and gas, from downhole formations. An operations control center 157 may assist in collecting data and making decisions to enhance operations in the oilfield. Data may include, for example, measurements of bottom hole pressure and tubing head pressure.

As shown in FIG. 1, the oil field operations 100 include a number of wells. Specifically, the oil field operations include first producing well 101, which uses an electric submersible pump 103 to produce a hydrocarbon (e.g., oil, gas, etc.); a second well 105, which relies on a gas lift to produce a hydrocarbon; and a third well 107, which produces a hydrocarbon on the basis of natural flow. First producing well 101, second well 105, and third well 107 deliver production fluids (e.g., hydrocarbon produced from their respective wells) to a production manifold 111. The production manifold collects multiple streams and outputs the streams to a gas and oil separator 112.

Upon receipt of the production fluids by the gas and oil separator 112, the gas and oil separator 112 separates various components from the fluids, such as produced water 121, produced oil 123, and produced gas 125, respectively to water disposal well 131, oil storage 133, and a compressor station 135. Oil storage 133 may transfer oil via an oil export pipeline 137. Similarly, the compressor station 135 may use gas export pipeline 139 to transfer gas. Finally, the compressor station 135 may process gas as an injection gas 141.

In order to adjust pressure on the injection gas, a meter and control system 143 may cooperate with an injection-gas manifold 145. The operation of the meter and control system 143 may regulate pressure of the injection gas as the injection gas is delivered to a wellhead tubing and casing 151. In addition to the injection gas, extracting efforts may rely upon a rod pump 155 to drive a downhole pump assembly via a reciprocating motion. In such cases, the rod pump 155 propels hydrocarbons to the production manifold 111.

In one embodiment of the invention, the operations control center 157 may receive data from sensors corresponding to the second well 105. Examples of sensors are depicted and described in further detail with respect to FIG. 2. The sensors may include, for example, a pressure sensor that measures fluid pressures at the wellhead. The operations control center 157 may also operate and/or control equipment in the third well 107.

An operations control center may use a data processing system including various components, such as those depicted in FIG. 3. These components may be, for example, a communication unit (i.e., receiver 301), a processor (i.e., CPU 303), and a memory (i.e., storage 301) all of which may be operatively connected via a bus. The memory is preferably configured to store one or more sets of instructions. Further, the processor unit (e.g., a microprocessor) is preferably configured to execute one or more of the sets of instructions to control, for example, the operation of the third well 107. In addition, the processor unit may also calculate averages or otherwise combine inputs, as will be described in relation to FIGS. 8 and 9. Finally, the communication unit preferably operates as an interface between the operations control center 157 and the other oilfield operations components. As such, the communications interface may be configured to receive data from the oilfield operations components and to send commands and/or data to the oilfield operations components.

FIG. 2 shows a portion of the wellbore operation, such as the wellbore operation of FIG. 1, in greater detail. This diagram depicts the cooperation of the operations control center with at least two wells. As discussed above, a purpose of the operations control center 207 is to collect data and control a drilling operation. The down-hole sensors 201 and well-head sensors 203 provide data (i.e., data collected and/or otherwise obtained from the down-hole sensors 201 and/or the well-head sensors 203). Upon receipt of the information, a first communication link 205 transfers the aforementioned data to the operations control center 207.

The operations control center 207 stores and, in some cases, optionally processes and/or analyzes the data. In some cases, the operations control center 207 may also generate and transmit control signals via the second communication link 209 a down-hole apparatus 211. For example, the operations control center 207 may automatically generate control signals using data obtained via communications link 205. In another example, the operations control center 207 may provide information to an operator that may consider the information, and then send control signals as desired. In addition, in some embodiments of the invention, the operations control center 207 may also provide feedback to down-hole sensors 201 and/or well-head sensors 203 using data obtained via communications link 205.

FIG. 3 shows an operations control center 300 that may be used with the oilfield operations of FIGS. 1 and 2. A receiver and data storage 301 corresponds to a device configured to receive and store data, for example, from a sensor (i.e., 201, 203 of FIG. 2) or other components internal and/or external to the operations control center 300. Receiver and data storage 301 may be implemented, for example, using a magnetic storage device, an optical storage device, a NAND storage device, any combination thereof, etc.

A processor unit 303 (e.g., a microprocessor) is configured to process data (e.g., data stored in the receiver and data storage 301), to store processed data and/or generate commands to operate various oilfield components shown in FIGS. 1 and 2. In addition, the processor unit 303 may operate output devices such as a printer 302, for example, to print out a questionnaire for collecting opinions. The processor unit 303 may also operate a display device 305 (e.g., a monitor, etc). For example, the display 305 may show templates such as template 401 described in FIG. 4. A decision-maker 321 may optionally contribute to selecting a work element for enhancing. For example, the decision-maker may operate a keyboard or mouse (not shown) to register estimates (discussed below). The processor unit 303 may also store such estimates or rated elements (discussed below) to the receiver and data storage 301.

FIGS. 4-9 depict specific examples of a flow of information tool (FIT) that may be used to analyze workflows of various industries, such as the oil and gas industry. More specifically, the flow of information tool (FIT) defines a methodology for valuing workflows of various operations. This valuation to estimate the changes in value for a workflow as well as the areas for improvement and technology gaps in a work process (or workflow). In general, a rapid screening tool is used to quickly enable understanding of which elements of a workflow require remedial action to improve value, and provides an estimate of value or a rated element based on expert interviews. Embodiments of the invention use templates as a guide to elicit information and to document the results.

In one embodiment, the flow of information tool (FIT) is designed to provide a method to estimate the value or impact of a work process (or workflow) and determine gaps in current and desired states. In one embodiment of the invention, a current state or existing state is a state that occurs first in time. Further, in one embodiment of the invention, a desired state may be a state that occurs later in time, or is proposed to occur. In one embodiment of the invention, an impact is the subjective estimation of the value of a workflow or work process. The impact may be a statistical combination of all rated elements given by a person. In addition, an impact may be a statistical combination of the contributions of several people to establish rated elements.

In one embodiment of the invention, the methodology determines how changes to a workflow increase value. This is performed by an interview, preferably with an expert user of the workflow under analysis. This flow of information tool (FIT) may be used to capture the common operational problems across many divisions of the same organization. Further, a major strength includes an understanding of the desired changes or enhanced proposed states to workflow elements for enhanced success of the workflow and a determination of relative value of the workflow and its improvements.

In one embodiment of the invention, a workflow may be described by a series of actions that are required to be performed in a specified order to achieve an objective, such as making an operating or business decision. As an example, first a measurement is made (for example, a pressure or temperature measurement). This measurement must be transmitted, and if the data is to be kept for later referral, the measurement must be transmitted to storage. Once stored, it must be accessed for analysis. Only then can a decision be made as to act upon the measurement. The result of this action results in a certain value being realized. Consequently, a workflow may include, for example, the steps of measuring, transmitting, storing, analyzing, and deciding.

These actions are described in the flow of information tool (FIT) or apparatus of this invention as elements in a measurement to decision value chain. The elements describe the steps in receiving, analyzing and acting upon information. Together they may describe a workflow of any description. The flow of information tool (FIT) is therefore suited to perform analysis of almost all types of workflows. Thus, a work element has value in the context of additional work elements that cooperate with the work element to form a work process (or workflow). Similarly, a workflow or work process has an overall value. The overall value is the combination of the values of each work element operating in cooperation with the remaining work elements. The overall value may be an absolute value as compared to not performing the operation. Alternatively, the overall value may be a value of a first form of the process as compared to a second form of the process, where the first and second forms of the process correspond to a particular combination of work elements.

In order for a processor unit (see FIG. 3) to establish a value of improving a workflow, a baseline is ideally established. In one embodiment of the invention, this is done by questioning one or more workflow experts or knowledgeable interviewees. The knowledgeable interviewee may indicate how he or she rates each of the current states of each individual work element of a workflow. The knowledgeable interviewee may rate a current state along a scale or between low and high values, for example, between 1 and 10. Each expert is then asked to rate how each individual work element will rate between these arbitrary values if new technologies and/or processes are applied to each work element of the workflow. Alternative scales may used. For example, an exemplary embodiment of the invention may use a color scale. The color red, for example, may indicate a low value. The color violet may indicate a high value. Other scales may also be used.

As discussed above, the flow of information tool (FIT) is used to identify and evaluate various work elements in a workflow. More specifically, knowledgeable interviewees (e.g., experts) rate each work element at its current state as well as at its proposed state. In this context, a rated element is a work element that corresponds to an estimation of a value, for example, as provided by one or more knowledgeable interviewees using one of the scales just mentioned. A baseline rated element is an exemplary rated element for a part and/or step combination (i.e., for a work element in the current state and/or baseline state). A baseline impact is an exemplary estimation of the value of a workflow using existing states. A baseline rated element may reflect an existing state and, consequently, a baseline impact may reflect the impact of an existing state.

In an embodiment of the invention, the answers to the questions are displayed graphically for fast and simple analysis. To achieve this objective, the flow of information tool (FIT) indicates: (i) which elements of the workflow are causing the biggest problems in improving value (and therefore where energy needs to be focused); (ii) a view of where the improvements are having most impact; (iii) remaining "gaps" which may be improved by application of technologies/processes not previously considered; (iv) an expert determined estimate of value of the current and future state or enhanced proposed state of the workflow; and (v) a consolidation of many interviews of the experts utilizing simple statistical methods to analyze the results to confirm consistency amongst the interviewees.

In one embodiment of the invention, indication (v) includes combining (for example, by taking the average) at least two expert estimated changes in value to form a change in value of the work process due to the at least one work element. In one embodiment of the invention, an expert estimated change in value is a difference in a value of a state of a work element that a knowledgeable interviewee indicates between an existing state and a future (or an enhanced proposed) state of the work element. In one embodiment of the invention, the flow of information tool (FIT) and method of the invention may also be applied retroactively to workflow improvements already implemented or to proposed improvements in workflows. For example, a user may use the flow of information tool (FIT) and method to audit a work process enhanced from a prior version of the work process (or workflow). Such an audit may permit a judgment of whether the forecasted or estimated value changes conform to values actually realized in operating work process (or workflow).

In a situation where a user operates the flow of information tool (FIT) to audit an enhanced work process, the existing state is a state that occurred first in time, and an enhanced proposed state is a state that occurred second in time.

Description of the Flow of Information Tool (FIT)

Figure 4:
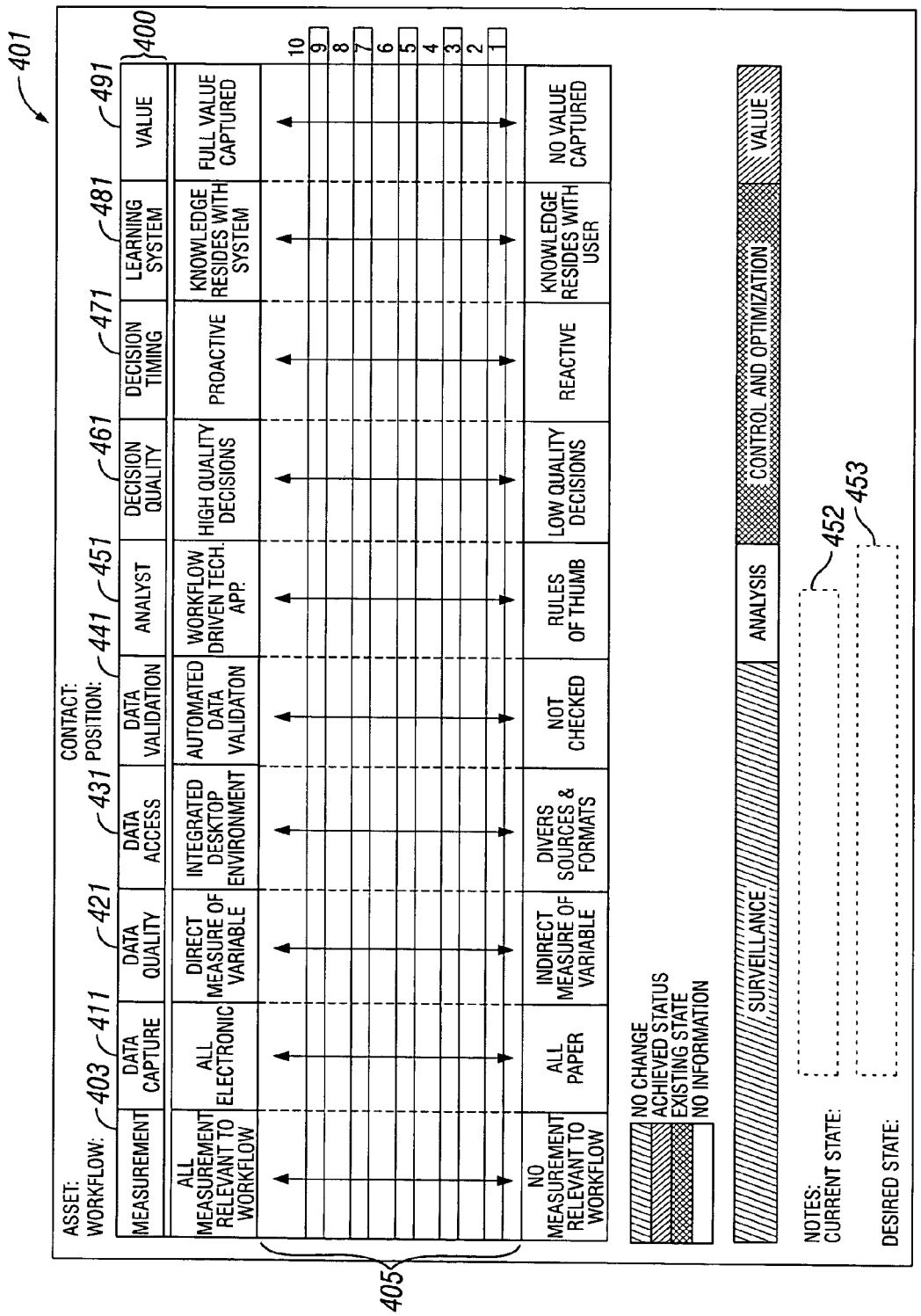
FIG. 4 shows an exemplary template for a flow of information tool (FIT) used to acquire and display information regarding work elements of a workflow, such as those used in combination with FIGS. 1, 2 and/or 3.
Figure 5:
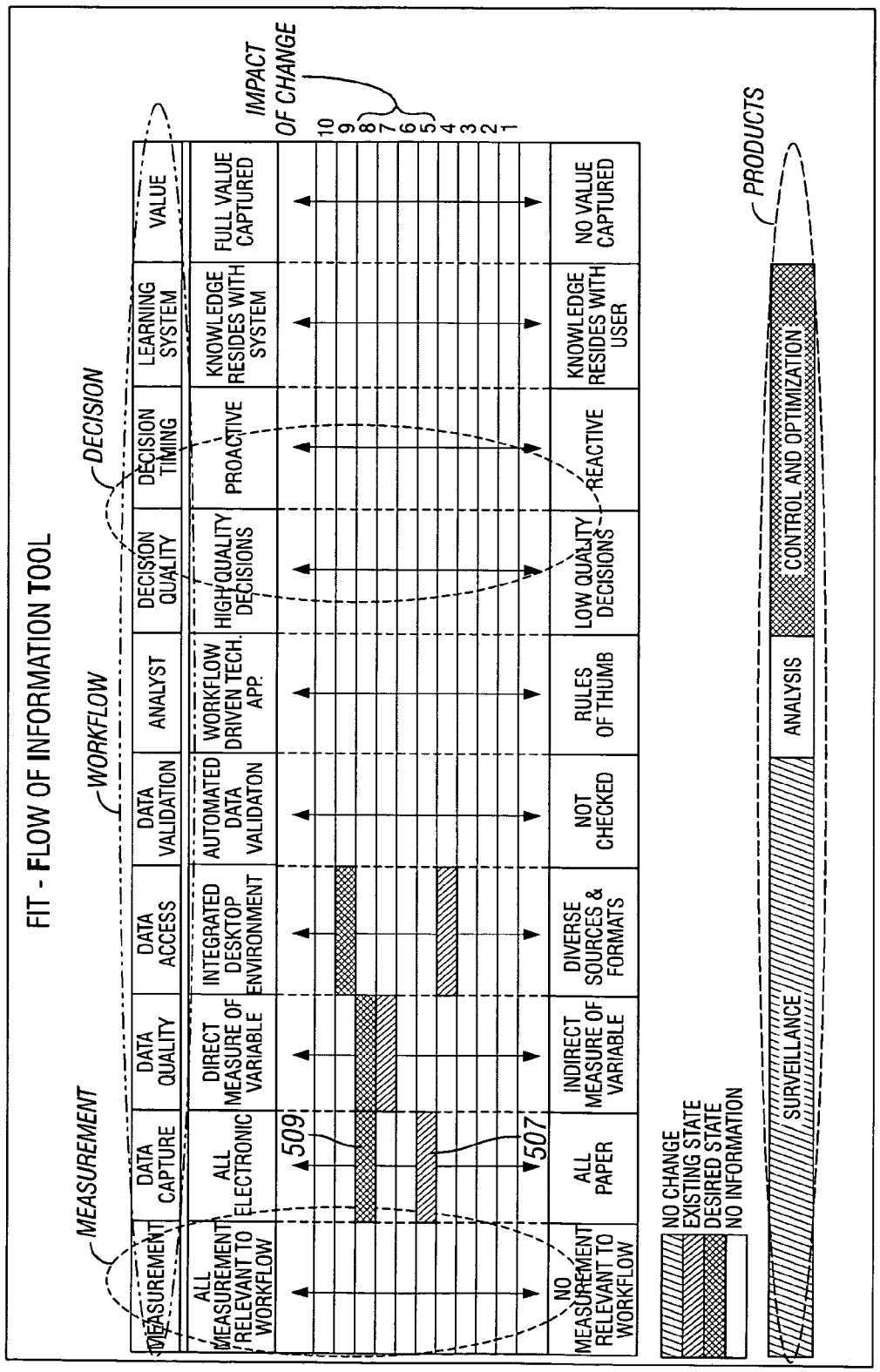
FIG. 5 shows the exemplary template from FIG. 4 during the process of interviewing an individual expert capturing his or her assessment of present and proposed states of workflow elements.

The follow section describes an embodiment of the flow of information tool in accordance with one embodiment of the invention. As discussed above, the flow of information tool (FIT) uses, as input, information obtained from interviewing knowledgeable interviewees. In order to facilitate the interview process, a flow of information (FIT) template may be used. FIGS. 4 and 5 show such a template as well as how such a template may be used to gather information from a knowledgeable interviewee.

Turning to FIG. 4, FIG. 4 shows a flow of information tool (FIT) template 401 made in accordance with an illustrative embodiment of the invention. Those skilled in the art will appreciate that other templates can also be constructed which fall within the scope of the invention. At the top of the flow of information tool (FIT) template is a set of the workflow elements 400 for a workflow. In the embodiment shown in FIG. 4, the workflow elements are measurement 403, data capture 411, data quality 421, data access 431, data validation 441, analyst 451, decision quality 461, decision timing 471, learning system 481, and value 491. The aforementioned workflow elements are part of an example of an embodiment of the invention discussed below in FIGS. 6-9.

Returning to FIG. 4, in this preferred embodiment, the asset (or business segment) location and the workflow (i.e., workflow associated with the asset or part of the asset) under analysis is recorded at the top of the flow of information tool (FIT) template. Also, though not shown, contacts or the experts interviewed or to be interviewed are listed so that more information can be obtained if necessary. In one embodiment of the invention, the flow of information tool (FIT) may operate as instructions within a processor unit to produce the flow of information tool (FIT) template on, for example, a display, a paper, or other tangible media. The processor unit may be, for example, processor unit (CPU) 303 of FIG. 3. The display may be, for example, display 305 of FIG. 3.

Continuing with the discussion of FIG. 4, in one embodiment of the invention, the middle section 405 of the flow of information tool (FIT) template includes a series of slider bars associated with workflow elements of the information flow. That is, the flow of information tool (FIT) may display or otherwise present a slider bar associated with each work element. The flow of information tool (FIT) may limit a user's control over the one or more of the slider bars to the extent of the slider bar(s). Consequently, a knowledgeable interviewee may make knowledgeable interviewee inputs using a mouse to operate the slider bar. Alternatively, a knowledgeable interviewee may add a machine readable mark to a paper version of the flow of information tool (FIT) template, and the flow of information tool (FIT) (or, more specifically, an input device associated with the flow of information tool (FIT) (e.g., an optical reader) may review the machine readable mark to ascertain the knowledgeable interviewee's response.

FIG. 5 shows an example of how a knowledge interviewee may input information onto the flow of information tool (FIT) template. Specifically, FIG. 5 depicts the exemplary template from FIG. 4 after an individual expert has been interviewed capturing his or her assessment of present and proposed states of workflow elements. In FIG. 5, an expert has indicated a baseline rated element for data capture 507. The baseline rated element for data capture 507 represents an existing state for the data capture workflow. As shown in FIG. 5, the baseline impact for the baseline rated element for data capture is "5." Another expert (or the same expert that provides input related to the baseline related element) may adjust a slider bar to indicate a rated element for data capture 509. As shown in FIG. 5, the rated element for data capture 509 is "8." As discussed above, the rated element for data capture 509 represents a knowledgeable interviewee's input as to the perceived value of the enhanced proposed state of the workflow element. Consequently, the value of the work process (or workflow) due to an enhancement of the work element "data capture" may be the relative difference between 8 and 5.

Figure 7:
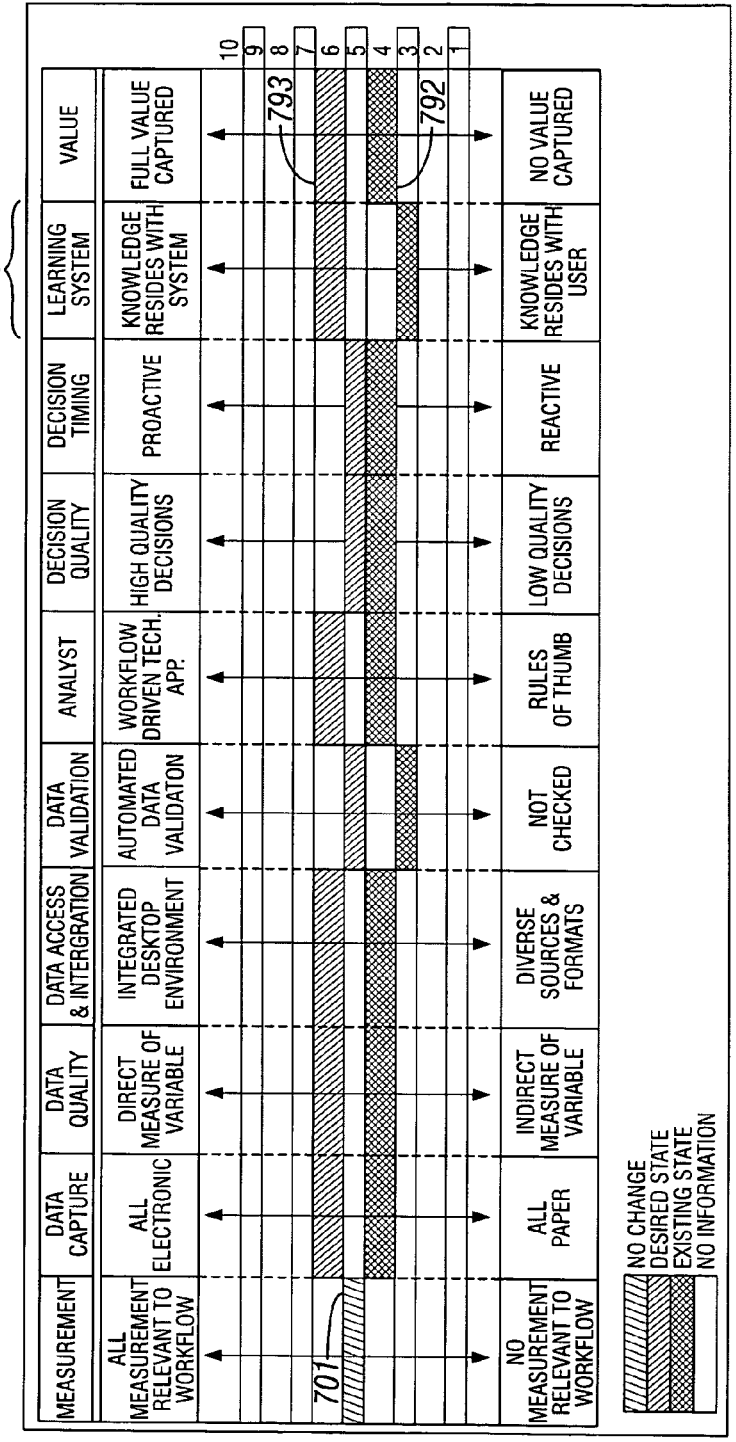
FIG. 7 shows the template of FIG. 4 wherein an interview has been completed and an assessment of the relative value enhancement due to enhancement of individual work elements is displayed.

With respect to obtaining input from a knowledgeable interviewee, in one embodiment of the invention, the knowledgeable interviewee places the slider indicating the state of the workflow element before and after the project. The project may involve replacing three work elements with three enhanced proposed work elements in the workflow elements of "Data capture," "Data Quality," and "Data Access." For example, the flow of information tool (FIT) of FIG. 5 may collect the baseline rated element for an enhanced proposed work element 509. The flow of information tool (FIT) may also collect the baseline rated element in relation to an enhanced proposed work element of the "Data Quality" workflow element, and an enhanced proposed work element of the "Data Access" workflow element, and, finally, may not alter any of the remaining workflow elements. For example, FIG. 7 shows a first bar showing the prior state 792, a second bar 793 showing the state after elements have been improved, and technologies implemented. A third bar 701 with slashes indicates there was no change to a given element.

In one embodiment of the invention, in order to collect the knowledgeable interviewee's inputs to an enhanced proposed work element, the flow of information tool (FIT) may transmit a message(s) to a knowledgeable interviewee soliciting an expert estimated change in value to at least one work element. Transmitting the message(s) may take the form of a processor unit printing a paper questionnaire to the knowledgeable interviewee. The processor unit may be, for example, processor (CPU) 303 of FIG. 3. In one embodiment of the invention, printing may include sending a facsimile to the knowledgeable interviewee. Alternatively, transmitting the message(s) may take the form of dispatching an electronic message (e.g., an e-mail) to the knowledgeable interviewee containing interview questions and options to select a response from a scale.

Furthermore, where an embodiment transmits a questionnaire, the embodiment may receive responses corresponding to the questions and convert such responses to, for example, a scale of discrete units. Conversion may occur, for example, in response to a knowledgeable interviewee returning a paper form. In one embodiment of the invention, for example, the processor unit may detect shaded ovals by use of an optical reader, thus forming units along a scale.

In one embodiment of the invention, the work elements, for example, the work elements shown in FIGS. 4-7, may be interdependent. Further, these work elements may follow a sequential path from measurement to value. To improve a workflow, some or all of the work elements should be considered. While a value can be derived by changing only one work element of the workflow, the flow of information tool (FIT) also allows one to view dependencies of the various work elements. For example, it is of little use to improve the analysis tools or the sensors to the best available on the market if the data cannot be accessed when required. Consequently, the knowledgeable interviewee applies an estimate of the changed workflow element when the changed workflow element is matched with one work element in each of the remaining workflow elements.

FIG. 4 further illustrates a section for obtaining assumptions, qualifications, and other information concerning one or more responses by a knowledgeable interviewee. In particular, a space for notes preferably exists so that others may understand why the interviewee responded in the manner that he or she did. This is ideally where the interviewee's beliefs about the application of new technologies and/or processes are recorded. For example, an interviewee may report existing state information in section 452 near the "Current State" legend. In addition, the interviewee may report beliefs about the desired state in a section 453 near the "Desired State" legend. The interviewee may use pen and paper, for example, to insert beliefs, etc. into the aforementioned sections (i.e., 452, 453). In addition, the interviewee may enter information using, for example, a keyboard connected to processor (CPU) 303 of FIG. 3. Thus, more information may be available during an audit phase that may provide insights concerning why an estimated change in value conformed with or varied from an observed change in value.

By way of example, and not limitation, examples of information that may be recorded into the aforementioned sections (i.e., 452, 453) include: (i) the quantitative and qualitative benefits and improvements made to the workflows, which are the value metrics such as efficiency, reduced downtime, accelerated production, increased ultimate recover, and safety including regulatory or compliance; (ii) efficiency, which is the same activity or decisions that results in a lower operating expenditure, saved capital expenditure or improved capital efficiency, and well or facility utilization; (iii) reduced downtime, which is minimizing lost or deferred production or avoiding falling below the original production target; (iv) accelerated production, which is exceeding the original production target; (v) increased ultimate recovery, which is exceeding the field life by reducing the economic limit or other means; and (vi) HES (Health Environmental Safety) benefits, which include penalty avoidance by preventing spills, leaks, injury, noncompliance, or loss of capital equipment.

FIGS. 6-9 show an example in accordance with one embodiment of the invention. Those skilled in the art will appreciate that FIGS. 6-9 are provided for exemplary purposes only and accordingly should not be construed as limiting the scope of the invention in any way.

Figure 6:
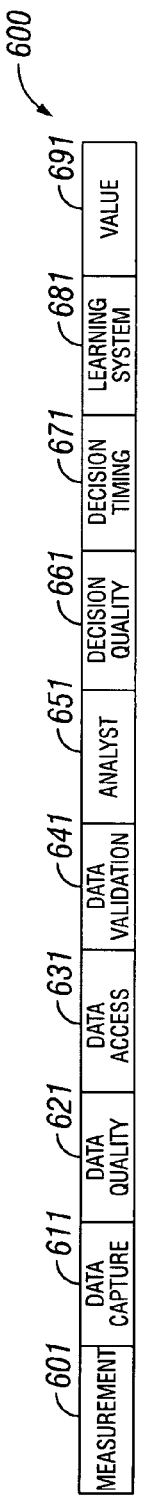
FIG. 6 shows a simple chart of exemplary workflow elements used in the template of FIGS. 4 and 5.

As discussed above, the flow of information tool (FIT) is used to analyze workflows. FIG. 6 shows an exemplary workflow.

The following is a description of the workflow elements for the present exemplary workflow, shown in FIG. 6, which uses data from remote sensors to make decisions in an oil & gas asset:

a) Measurement 601: This is an indication of the number of instruments and sensors that are in place to capture information that is relevant to the workflow. Examples of sensors are downhole pressure gauge, sand size analysis, well flow rates, production logs etc.

b) Data Capture 611: This is a measure of how the data is collected. Extreme scenarios are data captured manually on a clipboard and transported to the office, versus data automatically acquired, transmitted, time stamped, and stored in an electronic database.

c) Data Quality 621: It also describes the quality of the data in terms of its relevance to its application. Extreme scenarios are a measured value that is calculated from an indirect measurement (for example, calculating bottom hole pressure from tubing head pressure measurements) versus getting direct or distributed measurements of the desired variable.

d) Data Access 631: This is a measure of how easily the data is accessed from storage. Extreme scenarios are a person manually accessing the data by reviewing multiple paper files stored in various places, versus having a common electronic system where the data can be pushed to the user.

e) Data Validation 641: This is a measure of the degree of validation. It is also a measure of how much the data requires cleansing and validation for accuracy before transfer to the workflow. Extreme scenarios are data not checked versus data that is automatically validated. Some control systems allow setting limits on the process variables and alarming a user when the variables go outside the set limits.

f) Analyst 651: This is a measure of the type of analysis that is performed on the data. Extreme scenarios are using rules of thumb analysis versus data pushed to an application designed for a workflow (for example, applications to identify outlying well performance or to determine and track equipment failures).

g) Decision Quality 661: This is a measure of having the right information to make the right decisions or the likelihood of making high quality decisions. Extreme scenarios are having the poor data that lead to bad decisions versus having the right data and processes to make the good decisions.

h) Decision Timing 671: This is a measure of making timely decisions. Extreme scenarios are making the decisions as time permits, usually reactively, versus the ability to make real time, just-in-time, or proactive decisions that have an impact on operating efficiency, reducing downtime, accelerating production, lowering operating costs, or avoiding regulatory violations. Automating data movement allows a user to have more time to analyze and make better decisions.

i) Learning System 681: This is a range of the types of systems used to assist operations and to improve decision quality and decision timing. These are typically tools that monitor, analyze, or mine data to assist in making decisions. Extreme scenarios are tools that improve decision quality and timing versus a system that just increases the user's knowledge of operation.

j) Value 691: This is a measure of the amount of the potential value captured by the work process (or work flow) improvement or technology. Said another way, value 691 represents the overall value of the work process or workflow at a given state (i.e., at a current state or a desired/proposed state).

k) Current State: This is a description of the state of a given workflow element prior to the application of new technology or processes.

l) Desired State: This is a description of the perceived workflow element after the application of new technology or processes.

Interview Steps for An Asset Assessment

Continuing with the example, once the workflow and various work flow elements have been identified, and the flow of information template has been generated, information is obtained from one or more knowledgeable interviewees. As discussed, to capture the information required to populate the FIT template (including all its work elements), an interview with a workflow expert or experts is desired. In one embodiment of the invention, the interview covers a description of the FIT tool and its objectives. Also, the interview captures the existing and desired states and an estimate of potential or other value (using appropriate value metrics as explained previously) for workflows which have not been implemented yet.

Example of FIT Interviews

The following example describes how easy the tool is to use and understand.

FIT Example

Turning to FIG. 7, FIG. 7 shows an example of the results obtained from an interview performed using the FIT tool for the workflow shown in FIG. 6. The interviewee was asked how the application of some new technology might improve a certain workflow (for example, the work flow in FIG. 6). Note that in this example the new technology was not changing or updating any of the data sources (sensors) (i.e., the work element denoted as "Measurement"); therefore the interviewer directed the interviewee to answer this as no change. Accordingly, the flow of information tool (FIT) depicts "no change" (see slide bar 701) for the Measurement work element.

By scanning the flow of information tool (FIT) template, it is seen that the interviewee sees a small improvement in all of the work elements except the measurement workflow element. All the small improvements may result in a slight increase in overall value as denoted by the difference between the "value" work element associated with the current state and the "value" work element associated with the desired state (see 792 and 793 in FIG. 7). (This value may be a few thousand to a few millions of dollars, depending on the workflow in question). The largest gap is in learning system 781; that is, the interviewee believes this work element of the workflow will benefit the most from the application of the technology.

FIT Interviews—Perceived Value Gap Improvements

Figure 8:
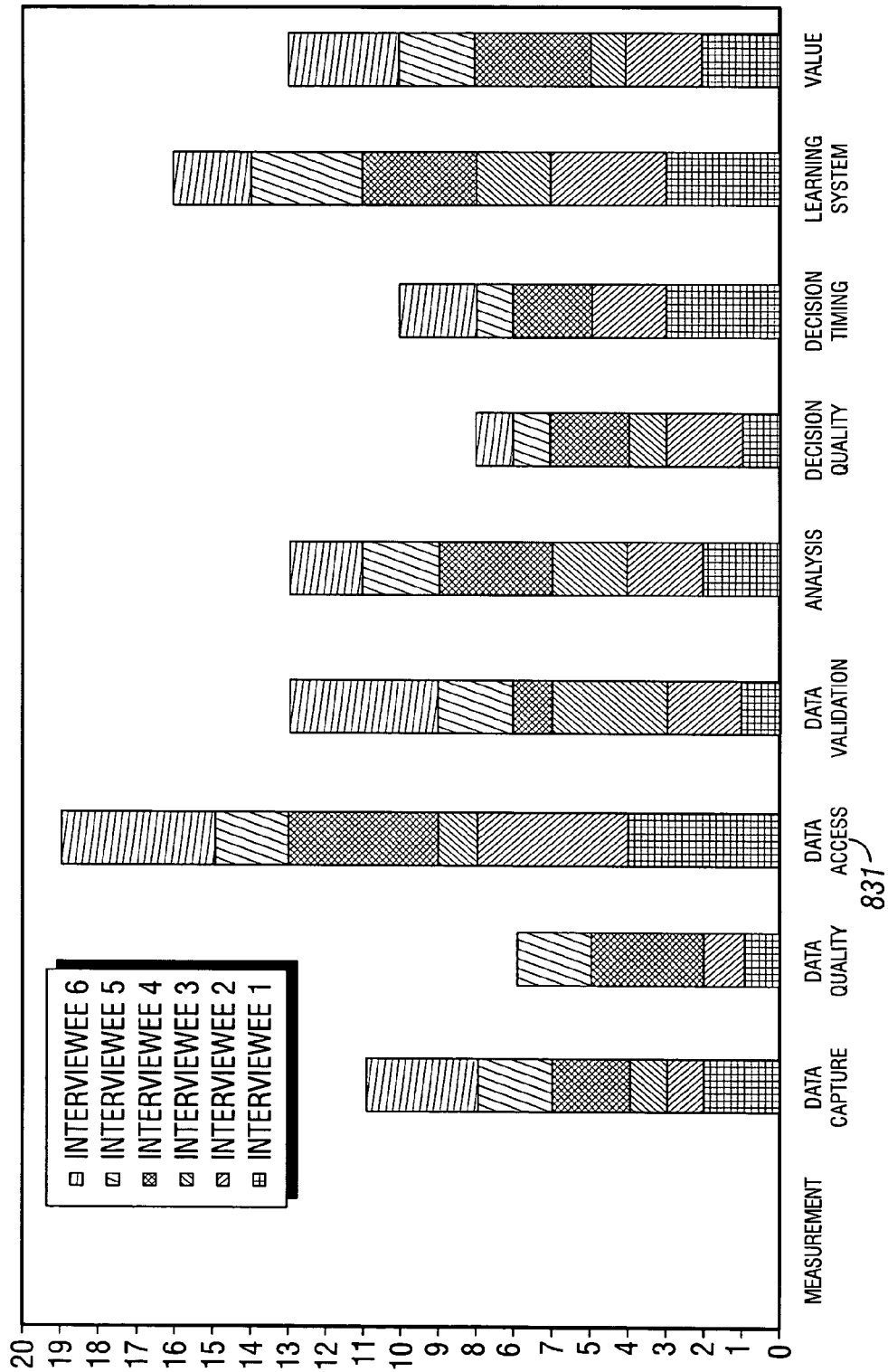
FIG. 8 shows the results of using the flow of information tool (FIT) to capture interview results from six individual experts using the template of FIG. 4.

Rather than look at each individual FIT screen (i.e., the results of the interview for a single interviewee on a flow of information tool (FIT) template), the exemplary flow of information tool (FIT) template of FIG. 8 may be used. With respect to FIG. 8, assume that six people (i.e., knowledgeable interviewees) were interviewed during this evaluation process. FIG. 8 summarizes the results of these six FIT interviews. To construct this chart (i.e., the chart shown in FIG. 8) the distance between the current and desired state answers (first and second bars in a column of, for example, the template of FIG. 7) has been taken from guidance numbers. The flow of information tool (FIT) may consolidate multiple expert estimated changes in value from at least two knowledgeable interviewees. This allows easy visualization of where the asset team perceives the greatest value addition due to adopting the relevant enhanced workflow. From FIG. 8 it is seen that Data Access 831 was the greatest perceived improved workflow element, in this particular example.

In one embodiment of the invention, each bar shown in FIG. 8 corresponds to the cumulative changes in value for each of the six interviewees for each work element. For example, the "data access" work element includes a cumulative total of 19. This value was obtained by adding the individual changes in value (i.e., 4, 4, 1, 4, 2, 4) for each of the six interviewees.

Figure 9:
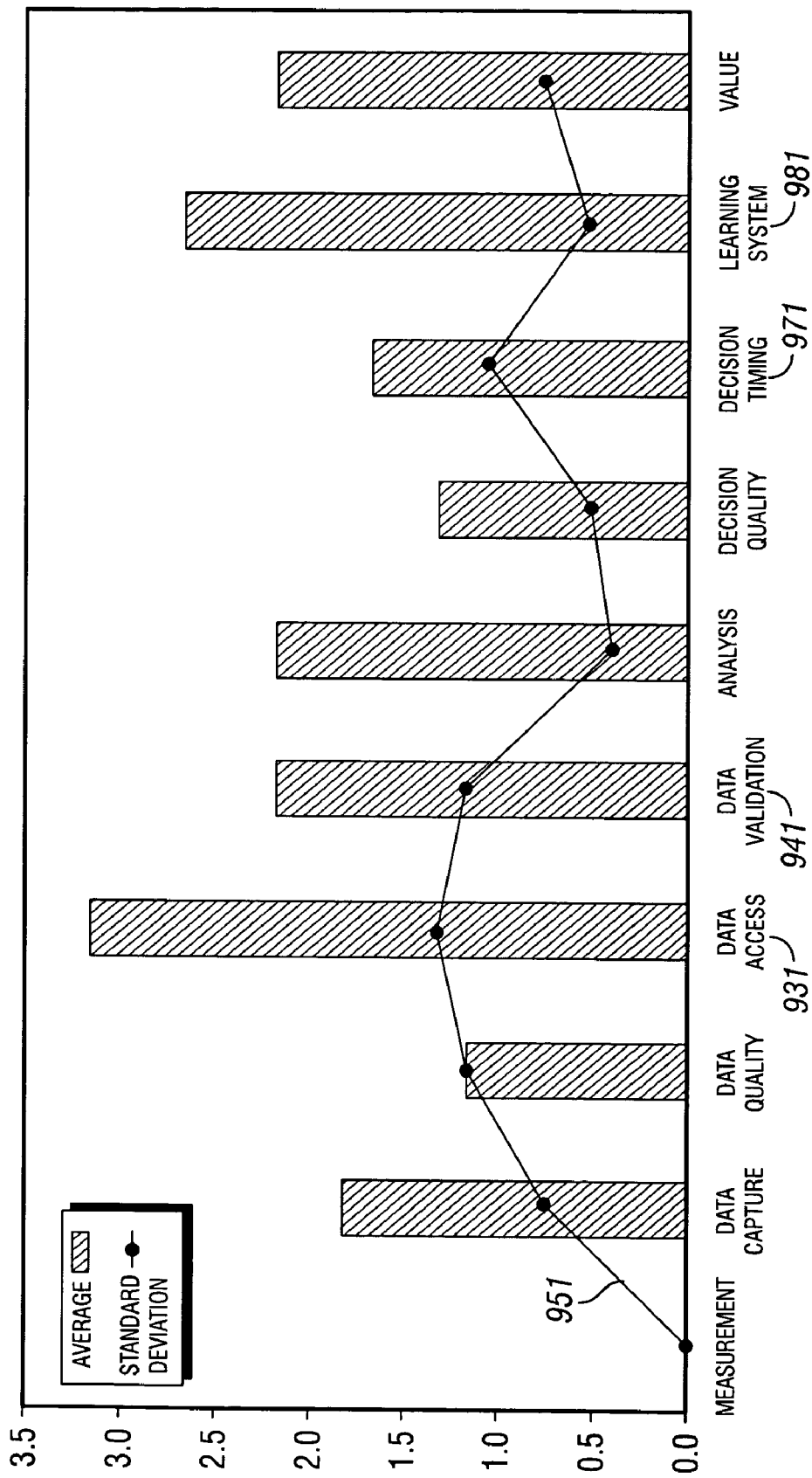
FIG. 9 shows basic statistical analyses of the six interviews showing average of variances and also standard deviations for each of the work elements of the workflow.

FIG. 9 shows a basic statistical analysis of the six FIT interviews. More specifically, FIG. 9 an alternative representation of the data shown in FIG. 8. More specifically, FIG. 9 shows the average of the variances and the standard deviations 951 of the changes in value for each of the work elements. For example, FIG. 9 shows that the greatest variance from the interviews relates to Data Access 931. The relatively high variance may suggest that "Data Acccess" is the area of greatest disagreement, with, for example, Interviewee 3 believing that the workflow will add minimal value to this element (see FIG. 8). There is however, little disagreement that the Learning System 981 element will see an increase in value due to the application of the workflows.

This tool was conceived as a tool to describe the benefits oil and gas assets may realize by adopting new technologies/processes. For example, the workflows may describe current oilfield operations, discontinued oilfield operations, and proposed oilfield operations. Specifically this tool/methodology is aimed at defining: common operational problems; the required workflow elements for success; and an estimate of value of the workflow.

The tool may also be used for other uses. For example, the tool may be used to assess Oil and Gas assets with the specific intention of defining what elements of a workflow require fixing. Other potential uses include: (i) determining which products will be best suited to solve given problems, based on the gaps or estimated changes in value recorded by the FIT and (ii) focusing attention on areas of deficiency in a product portfolio to allow research funds to be targeted towards what the users need to improve their particular work flow processes. In addition, the tool allows a quick, simple, and intuitive process to understand where the poorly performing elements in a workflow are, and therefore, which elements need to be addressed.

Figure 10:
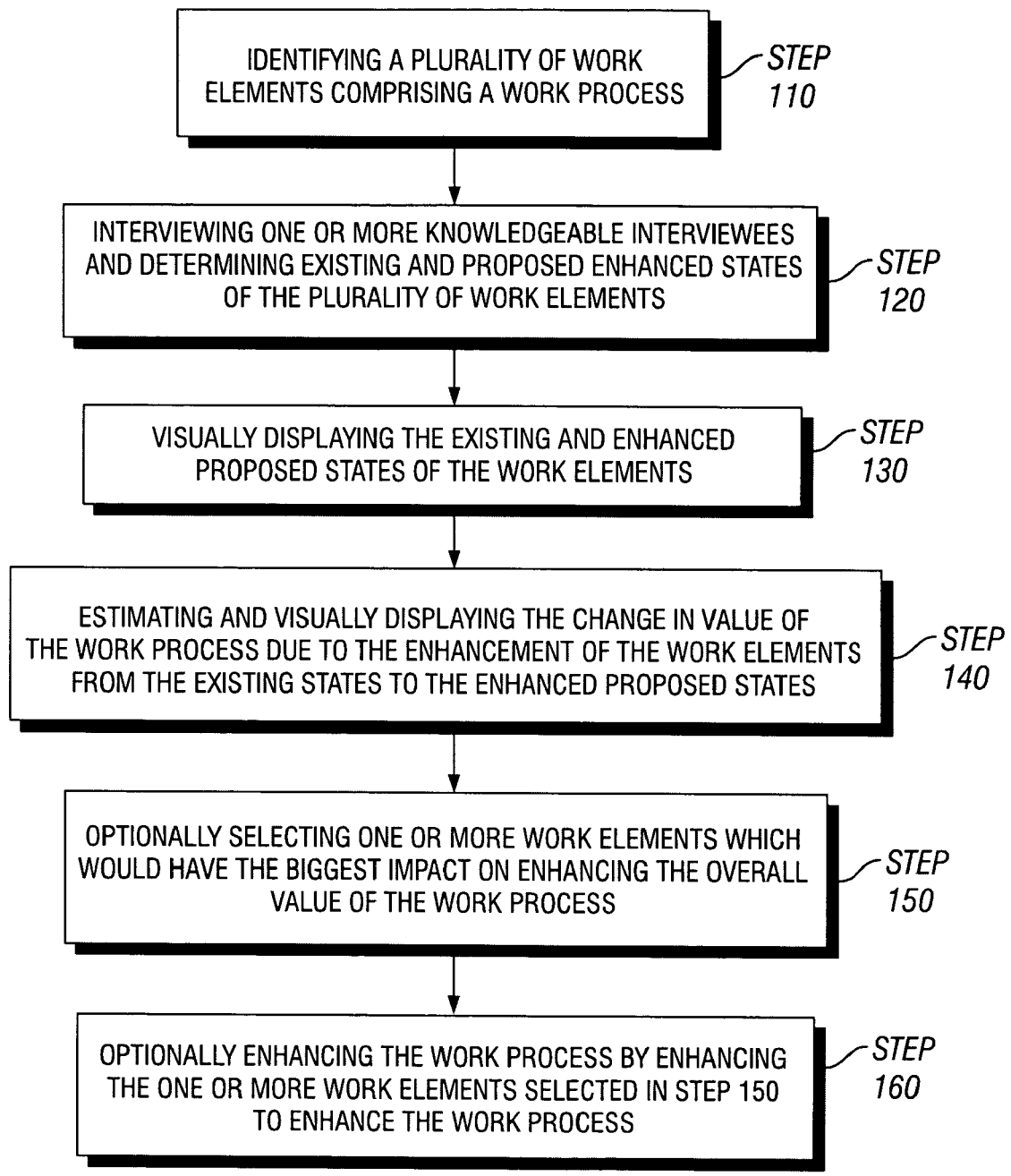
FIG. 10 shows a flow chart capturing the steps of the flow of information tool (FIT) of the present invention to determine which work element or work elements should be enhanced to provide the greatest enhancement to the overall value of a workflow relative to enhancing other work elements.

FIG. 10 shows a flowchart describing the steps of the present invention. In one embodiment of the invention, one or more of the steps discussed below may be omitted, repeated, and/or performed in a different order than the order shown in FIG. 10. Accordingly, the specific arrangement of steps shown in FIG. 10 should not be construed as limiting the scope of the invention.

In step 110, a plurality of work elements comprising a work process is identified. One or more knowledgeable interviewees are interviewed in step 120 to determine existing and enhanced proposed states of the plurality of work elements. Ideally, these existing and proposed states of the work elements are visually displayed in step 130 (see e.g., FIG. 4). In step 140, the change in value of the work process is estimated and displayed due to the change of the work elements from the existing state to the enhanced proposed states. For example, the flow of information tool (FIT) may display the change in value as two slider bars on a slider (see, for example, FIG. 7, value existing state 792, and value enhanced proposed state 793). In optional step 150, one or more work elements are selected which are estimated to have the biggest impact on enhancing the overall value of the work process.

A work element estimated to have the biggest impact may have a corresponding estimated value that is larger than an estimated value of a second work element. For example, referring to FIG. 9, between the average estimated value for data access 931 and the average estimated value for data validation 941, the work element estimated to have the biggest impact is the data access 931. Also, for example, between the average estimated value for learning system 981 and the average estimated value for decision timing 971, the work element estimated to have the biggest impact is the learning system 981. Thus, a biggest impact on enhancing overall value is the larger of the estimated changes in value of a first pair of work elements in a workflow compared to an estimated change in value of a second pair of work elements.

Figure 11:
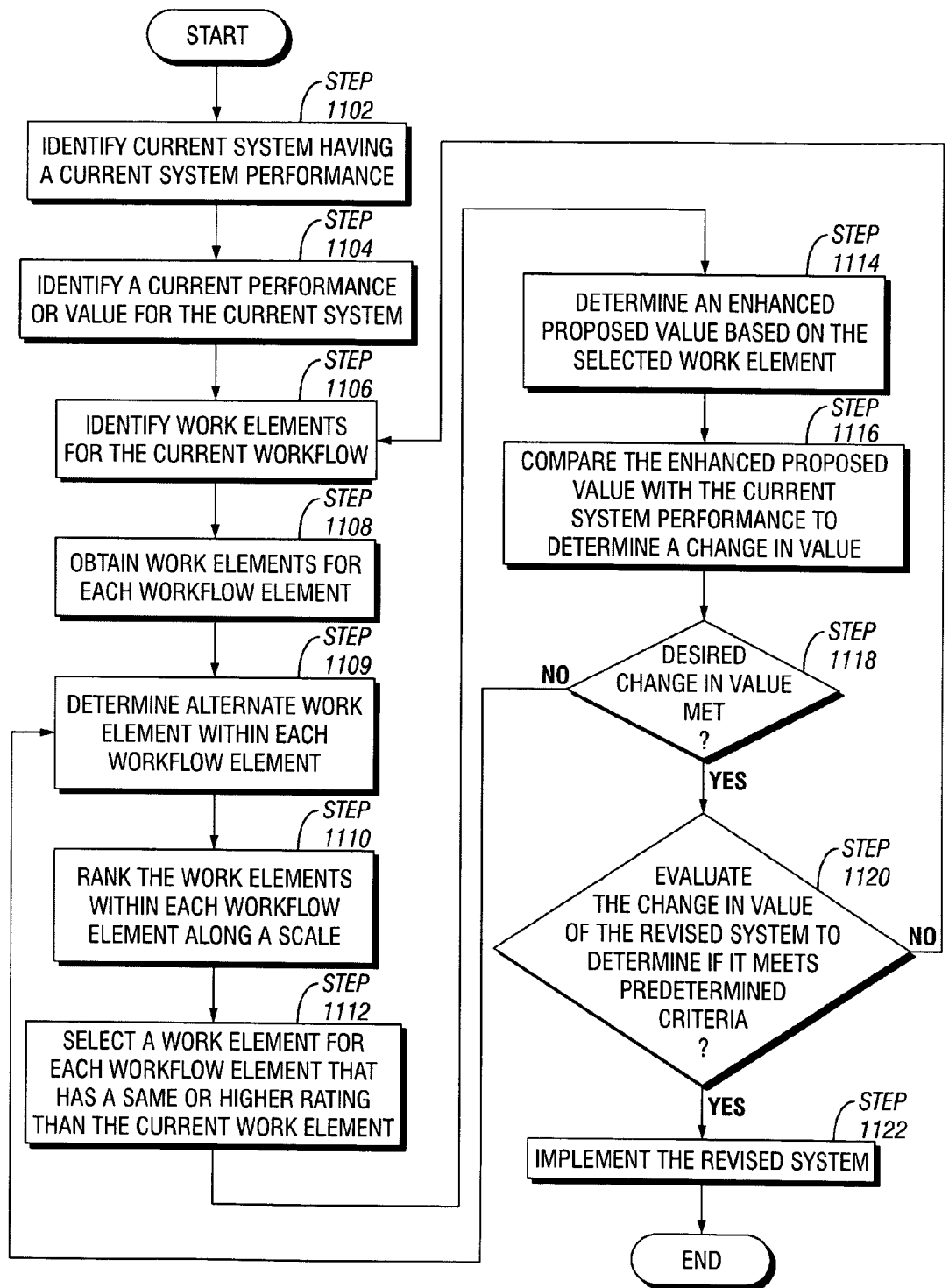
FIG. 11 is a flow chart depicting a method of valuation of a workflow of an operation, such as the oilfield operations of FIGS. 1 and 2, using the FIT tool.

These selected work elements are then optionally enhanced in step 160 to provide a second work process with enhanced value relative to a first work process comprising work elements with the existing states. If a number of knowledgeable interviewees are interviewed, statistical data can be generated which can be displayed to show the relative variance and deviations of estimates of the existing and proposed states of work elements and the relative value of the existing and enhanced proposed work processes. FIG. 11 shows a method of valuation of a workflow of an operation, such as the oilfield operations of FIGS. 1 and 2. With this method, the operation is broken down into elements, and then various techniques for each element are selected to optimize the operation.

As shown in FIG. 11, step 1102 involves identifying the current system. For example, the system of FIGS. 1 and 2 is an oilfield operation used to measure production flow. A current system or workflow performance is identified for the operation step 1104. The workflow elements for the current system or workflow are also identified step 1106. The workflow elements may be physical components and methods of operations, such as data measurement (see also, e.g., 401, 411, 421, 431, 441, 451, 461, 471 and 481 of FIG. 4). A current technique or work element used for each workflow element of the current system step 1108 is also obtained. For example, the technique or work element for the data capture element (411) would be data storage (301) of FIG. 3. Alternate data techniques (i.e., alternate work elements), for each workflow element, such as all paper for workflow element (411) of FIG. 4 are also determined step 1109. The techniques may then be ranked along a scale step 1110 as depicted by the middle section 405 in FIG. 4. The ranking may be determined subjectively, for example by interview, or objectively, for example by automated computer. The ranking may associate a work element rank with a work element. Thus the work element rank may be a number selected from the scale.

By analyzing the workflow elements and the techniques or work elements, a revised system may be generated. To do so, a selected technique or work element for each workflow element is selected from the current and alternate techniques for each workflow element step 1112. Preferably, each selected technique has a rating that is at least as high as the current technique step 1112. A revised system performance or enhanced proposed value may then be determined based on the selected techniques step 1114. This revised system performance or enhanced proposed value may be compared with the current system performance to determine an incremental value or change in value step 1116. The operation may be repeated until a desired incremental value (e.g., change in value) or desired system performance is achieved step 1118. The incremental value or change in value may optionally be evaluated to determine if it meets predetermined criteria step 1120. If desired, the revised system step 1122 based on one or more work elements may be implemented. The process may be repeated as desired.

The invention also includes an apparatus or computer tool which utilizes the aforementioned method. Those skilled in the art can readily create such a tool using the above described methodology. Also, the invention includes computer readable media which includes instructions for carrying out the above-identified method on a computer. While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention. For example, quantitative values could be determined in place of, or in addition to the qualitative values assigned using the slider bars. Algorithms could be used to weight and compile quantitative value estimations based upon the individual values assigned to each of the work elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for optimizing a portion of an oilfield operation used to generate hydrocarbons from a downhole reservoir, the method comprising:

identifying a first work element and a second work element for a first workflow element of the portion of the oilfield operation;

identifying a third work element for a second workflow element of the portion of the oilfield operation;

performing, on a computer processor, a first statistical analysis of a first plurality of scaled rankings of the first work element to determine a first existing state value and a first enhanced state value of the first workflow element, wherein the first plurality of scaled rankings of the first work element is obtained by interviewing at least one operator of the oilfield operation;

performing, on the computer processor, a second statistical analysis of a second plurality of scaled rankings of the second work element to determine a second existing state value and a second enhanced state value of the first workflow element, wherein the second plurality of scaled rankings of the second work element is obtained by interviewing the at least one operator of the oilfield operation;

performing, on the computer processor, a third statistical analysis of a third plurality of scaled rankings of the third work element to determine a third existing state value and a third enhanced state value of the second workflow element, wherein the third plurality of scaled rankings of the third work element is obtained by interviewing the at least one operator of the oilfield operation;

calculating, on the computer processor, a first difference between the first enhanced state value and the first existing state value for the first work element;

calculating, on the computer processor, a second difference between the second enhanced state value and the second existing state value for the second work element;

calculating, on the computer processor, a third difference between the third enhanced state value and the first existing state value for the third work element;

in response to selecting the first work element for the first workflow element, combining the first difference and the third difference to generate a change in value of the portion of the oilfield operation;

displaying the change in value of the portion of the oilfield operation;

in response to selecting the second work element for the first workflow element, combining the second difference and the third difference to generate an updated change in value of the portion of the oilfield operation; and optimizing the portion of the oilfield operation based on the updated change in value.

2. The method of claim 1, further comprising:
selecting the first work element, wherein the first difference exceeds the second difference.

3. The method of claim 1, wherein each of the first workflow element and the second workflow element comprise at least one selected from a group consisting of measurement, data capture, data quality, data access, data validation, analyst, decision quality, decision timing, learning system and value.

4. The method of claim 1, wherein the first work element comprises at least one selected from a group consisting of all measurements relevant to workflow, no measurement relevant to workflow, all electronic, and all paper.

5. The method of claim 1 further comprising:
determining that the change in value fails to meet a predetermined criteria.

6. The method of claim 1, wherein combining the first difference and the third difference comprises summing the first difference and the second difference.

7. The method of claim 1, further comprising:
displaying the first existing state value, the second existing state value, the first enhanced state value, and the second enhanced state value.

8. A system for optimizing a portion of an oilfield operation used to generate hydrocarbons from a downhole reservoir, comprising:

a data storage for storing a template having a first work element and a second work element for a first workflow element of the portion of the oilfield operation and a third work element for a second workflow element of the portion of the oilfield operation;

a data input device for:
receiving a first plurality of scaled rankings of the first work element, a second plurality of scaled rankings of the second work element, and a third plurality of scaled rankings of the third work element, wherein each of the first plurality of scaled rankings, the second plurality of scaled rankings, and the third plurality of scaled rankings is obtained by interviewing at least one operator of the oilfield operation;

selecting the first work element for the first workflow element; and selecting the second work element for the first workflow element; and a processor operatively coupled to the data input device for:
performing a first statistical analysis of the first plurality of scaled rankings of the first work element to determine a first existing state value and a first enhanced state value of the first workflow element;

performing a second statistical analysis of the second plurality of scaled rankings of the second work element to determine a second existing state value and a second enhanced state value of the second workflow element;

performing a third statistical analysis of the third plurality of scaled rankings of the third work element to determine a third existing state value and a third enhanced state value of the third workflow element;

calculating a first difference between the first enhanced state value and the first existing state value for the first work element;

calculating a second difference between the second enhanced state value and the second existing state value for the second work element;

calculating a third difference between the third enhanced state value and the first existing state value for the third work element;

in response to selecting the first work element for the first workflow element, combining the first difference and the third difference to generate a change in value of the portion of the oilfield operation; and in response to selecting the second work element for the first workflow element, combining the second difference and the third difference to generate an updated change in value of the portion of the oilfield operation.

9. The system of claim 8, wherein the first work element comprises at least one selected from a group consisting of all measurements relevant to workflow, no measurement relevant to workflow, all electronic, and all paper.

10. The system of claim 8, wherein the first work element accelerates production in the oilfield operation.

11. The system of claim 8, wherein combining the first difference and the third difference comprises summing the first difference and the second difference.

12. A computer readable medium storing instructions for optimizing a portion of an oilfield operation used to generate hydrocarbons from a downhole reservoir, the instructions comprising functionality to:

identify a first work element and a second work element for a first workflow element of the portion of the oilfield operation;

identify a third work element for a second workflow element of the portion of the oilfield operation;

perform a first statistical analysis of a first plurality of scaled rankings of the first work element to determine a first existing state value and a first enhanced state value of the first work element, wherein the first plurality of scaled rankings of the first work element is obtained by interviewing at least one operator of the oilfield operation;

perform a second statistical analysis of a second plurality of scaled rankings of the second work element to determine a second existing state value and a second enhanced state value of the second work element, wherein the second plurality of scaled rankings of the second work element is obtained by interviewing the at least one operator of the oilfield operation;

perform a third statistical analysis of a third plurality of scaled rankings of the third work element to determine a third existing state value and a third enhanced state value of the second workflow element, wherein the third plurality of scaled rankings of the third work element is obtained by interviewing the at least one operator of the oilfield operation;

calculate a first difference between the first enhanced state value and the first existing state value for the first work element;

calculate a second difference between the second enhanced state value and the second existing state value for the second work element;

calculate a third difference between the third enhanced state value and the first existing state value for the third work element;

in response to selecting the first work element for the first workflow element, combine the first difference and the third difference to generate a change in value of the portion of the oilfield operation;

display the change in value of the portion of the oilfield operation; and in response to selecting the second work element for the first workflow element, combine the second difference and the third difference to generate an updated change in value of the portion of the oilfield operation.

13. The computer readable medium of claim 12, the instructions further comprising:

selecting the first work element, wherein the first difference exceeds the second difference; and enhancing the first workflow element based on the updated change in value of the portion of the oilfield operation.

14. The computer readable medium of claim 12, the instructions further comprising functionality to:

display the first existing state value, the second existing state value, the first enhanced state value, and the second enhanced state value.

\* \* \* \* \*